United States Patent
Yanagi et al.

(10) Patent No.: US 8,426,496 B2
(45) Date of Patent: Apr. 23, 2013

(54) INK-JET INK COMPOSITION, INK SET, AND IMAGE FORMING METHOD

(75) Inventors: Terukazu Yanagi, Kanagawa (JP); Takahiro Ishizuka, Kanagawa (JP); Akio Tamura, Kanagawa (JP); Takahiro Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 475 days.

(21) Appl. No.: 12/711,470

(22) Filed: Feb. 24, 2010

(65) Prior Publication Data
US 2010/0227065 A1 Sep. 9, 2010

(30) Foreign Application Priority Data

Mar. 3, 2009 (JP) ................. 2009-049631

(51) Int. Cl.
*C09D 11/10* (2006.01)
*C08K 5/09* (2006.01)
(52) U.S. Cl.
USPC ............ 523/160; 524/157; 524/284; 427/466
(58) Field of Classification Search .................. 523/160; 524/157, 284, 417, 422
See application file for complete search history.

(56) References Cited

U.S. PATENT DOCUMENTS

| | | | |
|---|---|---|---|
| 6,830,326 B2 * | 12/2004 | Tsao et al. | 347/98 |
| 2004/0186200 A1 * | 9/2004 | Yatake | 523/160 |
| 2007/0229577 A1 | 10/2007 | Morimoto | |

FOREIGN PATENT DOCUMENTS

| | | |
|---|---|---|
| JP | 2004-123904 A | 4/2004 |
| JP | 2007-100071 A | 4/2007 |
| JP | 2007-261205 A | 10/2007 |

OTHER PUBLICATIONS

Japanese Notice of Reasons for Rejection issued on Mar. 5, 2013, in Japanese Patent Application No. 2009-049631 (Partial English translation is provided).

* cited by examiner

*Primary Examiner* — Vu A Nguyen
(74) *Attorney, Agent, or Firm* — Birch, Stewart, Kolasch & Birch, LLP

(57) ABSTRACT

An ink-jet ink composition comprising: a pigment, a polymer pigment dispersion, polymer particles, a hydrophilic organic solvent, water, and at least one of a water-soluble acidic compound having a molecular weight of 200 or less or a salt thereof in an amount of from 50 ppm to 1,000 ppm; an ink set that includes the ink-jet ink composition and a treatment liquid that forms an aggregate when contacted with the ink-jet ink composition; and an image forming method using the ink set.

13 Claims, No Drawings

INK-JET INK COMPOSITION, INK SET, AND IMAGE FORMING METHOD

CROSS-REFERENCE TO RELATED APPLICATION

This application claims priority under 35 USC 119 from Japanese Patent Application No. 2009-049631 filed on Mar. 3, 2009, the disclosure of which is incorporated by reference herein.

BACKGROUND OF THE INVENTION

1. Field of the Invention

The present invention relates to an ink-jet ink composition, an ink set, and an image forming method.

2. Description of the Related Art

Ink-jet recording methods use a large number of nozzles arranged in an ink-jet head, from which ink droplets are ejected when recording is performed. Ink-jet recording methods are widely used, because they make it possible to record high-quality images on a variety of recording media.

As the ink-jet recording methods, a two-part reactive ink recording method is known, in which two kinds of liquids including an ink and a treatment liquid serving to aggregate the ink are reacted so as to aggregate the ink and to promote the fixation of the ink. For example, an ink-jet recording method is disclosed, in which an ink composition containing a pigment and a resin emulsion and a reaction liquid containing a polyvalent metal salt are applied onto a recording medium. In this method, running and unevenness of images are considered to be prevented.

On the other hand, when recording is performed on plain paper or the like, sufficient performance sometimes cannot be obtained with respect to, for example, fixability (for example, scratch resistance) or resolution, in addition to color forming density. In particular, this is the case when increasing the speed of ink-jet recording, and a recording method more suitable for high speed recording using a single pass system capable of recording by one operation of a head, as opposed to a shuttle scanning system, is in demand.

In relation to the above, as an image forming method capable of high speed printing, an image recording method in which an ink composition that contains a pigment dispersed with a low molecular weight pigment dispersant and polymer particles is contacted with an acidic treatment liquid (for example, see Japanese Patent Application Laid-Open (JP-A) No. 2007-100071.) is known.

However, the image recording method described in JP-A No. 2007-100071 does not provide a sufficient ink ejection stability in some cases. The dot diameter difference between a primary color dot and a secondary color dot becomes large, whereby image quality often lowers.

SUMMARY OF THE INVENTION

The present invention has been made in view of the above circumstances and provides an ink-jet ink composition, an ink set, and an image forming method.

A first aspect of the present invention provides an ink-jet ink composition comprising: a pigment, a polymer pigment dispersant, polymer particles, a hydrophilic organic solvent, water, and at least one of a water-soluble acidic compound that has a molecular weight of 200 or less or a salt thereof in an amount of from 50 ppm to 1,000 ppm.

A second aspect of the present invention provides an ink set that comprising: the ink-jet ink composition according to the first aspect of the present invention and a treatment liquid that forms an aggregate when contacted with the ink-jet ink composition.

A third aspect of the present invention provides an image forming method comprising: applying, onto a recording medium, a treatment liquid that forms an aggregate when contacted with the ink-jet ink composition the first aspect of the present invention; and applying the ink-jet ink composition onto the recording medium so as to form an image.

DETAILED DESCRIPTION OF THE INVENTION

Ink-Jet Ink Composition

The ink-jet ink composition (hereinafter, simply referred to as "ink composition" in some cases) includes a pigment, a polymer pigment dispersant, polymer particles, a hydrophilic organic solvent, water, and at least one selected from a water-soluble acidic compound that has a molecular weight of 200 or less and a salt of the water-soluble acidic compound. The content of at least one kind selected from the water-soluble acidic compound and the salt of the water-soluble acidic compound is from 500 ppm to 1,000 ppm.

The ink composition formulated as described above improves an ink ejection stability. In addition, the dot diameter difference between a primary color dot and a secondary color dot is allowed to be reduced in an image forming method in which the ink composition and a treatment liquid that forms an aggregate when contacted with the ink composition are used.

(Water-Soluble Acidic Compound)

The water-soluble acidic compound is not particularly limited and may be an organic compound or an inorganic compound as long as it is a compound that has a dissociative functional group exhibiting acidic when dissolved in water and a molecular weight of 200 or less. Note that, the term of "water-soluble" used herein denotes that 5 g or more are dissolved in 100 g of water at 25° C.

Examples of the water-soluble compound and the salt thereof in the present invention include an acidic compound such as a carboxylic acid derivative, a sulfonic acid derivative, a phosphoric acid derivative, or an inorganic acid, and a compound that is obtained from the foregoing acidic compounds in which the acidic functional groups thereof form a salt. Among these, as the water-soluble acidic compound, an organic compound selected from the carboxylic acid derivative, the sulfonic acid derivative, and the phosphoric acid derivative is preferable from the viewpoint of the ejection stability. The carboxylic acid derivative or the sulfonic acid derivative is more preferable, and the carboxylic acid derivative is still more preferable.

The molecular weight of the water-soluble acidic compound is 200 or less, but from the viewpoint of the ejection stability, from 30 to 200 is preferable, from 45 to 150 is more preferable, and from 50 to 140 is still more preferable.

When the molecular weight of the water-soluble acidic compound exceeds 200, the ejection stability is sometimes lowered.

Examples of the cation that forms a salt with the water-soluble acidic compound include: an alkali metal ion such as a sodium ion, a lithium ion, or a potassium ion; an ammonium ion; and an aminoalcohol ion such as a monoethanol ammonium ion ($HOCH_2CH_2NH_3^+$). The cation may be one kind or in a combination of two or more kinds thereof.

Specific examples of the water-soluble acidic compound and the salt thereof include: an acidic compound having a carboxy group such as acrylic acid, methacrylic acid, maleic acid, malic acid, tartaric acid, fumaric acid, lactic acid, succinic acid, glutaric acid, butanoic acid, or acetic acid and the salt thereof; and an acidic compound having a sulfonyl group such as methane sulfonic acid or p-toluene sulfonic acid and the salt thereof.

Among these, from the viewpoint of minimizing the dot diameter difference between a primary color dot and a secondary color dot, at least one kind selected from an acidic compound having a carboxy group and the salt thereof and an inorganic acid salt is preferable; at least one kind selected from an acidic compound that has a molecular weight of from 30 to 200 and a carboxy group and the salt thereof and an inorganic acid salt is more preferable; and at least one kind selected from maleic acid, malic acid, tartaric acid, succinic acid, glutaric acid, acetic acid, and butanoic acid and an alkali metal salt thereof is still more preferable.

In the present invention, the content of the water-soluble acidic compound and the salt thereof is from 50 ppm to 1,000 ppm with respect to the ink composition, preferably from 100 ppm to 800 ppm, and more preferably from 200 ppm to 600 ppm.

When the content is less than 50 ppm, the dot diameter difference between a primary color dot and a secondary color dot is not minimized in some cases. When the content exceeds 1,000 ppm, the ejection reliability of the ink composition is lowered in some cases.

In the present invention, from the viewpoints of the ejection reliability and the dot diameter difference between a primary color dot and a secondary color dot, it is preferable that at least one kind selected from an acidic compound having a carboxy group and the salt thereof and an inorganic acid salt is contained in an amount of from 100 ppm to 800 ppm; it is more preferable that an acidic compound that has a molecular weight of from 30 to 200 and a carboxy group and the salt thereof and an inorganic acid salt is contained in an amount of from 200 ppm to 600 ppm; and it is still more preferable that at least one kind selected from maleic acid, malic acid, tartaric acid, succinic acid, glutaric acid, acetic acid, and butanoic acid and an alkali metal salt thereof is contained in an amount of from 200 ppm to 600 ppm.

(Coloring Particles)

The ink-jet ink composition of the present invention includes at least one kind of pigment and at least one kind of polymer pigment dispersant. In the present invention, the pigment and the polymer pigment dispersant preferably compose coloring particles, and more preferably the coloring particles are composed by coating the pigment with the polymer pigment dispersant.

(Pigment)

The pigment in the present invention is not particularly limited, but conventionally known organic and inorganic pigments are usable. Specifically, the pigment described in JP-A No. 2007-100071 is included. In particular, an azo pigment, a phthalocyanine pigment, an anthraquinone pigment, a quinacridone pigment, and a carbon black pigment are preferably used.

(Polymer Pigment Dispersant)

The polymer pigment dispersant (hereinafter, simply referred to as "dispersant" in some cases) in the present invention is not particularly limited as long as it is a water-insoluble polymer and is capable of dispersing a pigment. Conventionally known polymer pigment dispersants are usable. In the present invention, the polymer pigment dispersant may be composed of both hydrophobic structural unit and hydrophilic structural unit that are incorporated therein, for example.

The monomer that composes the hydrophobic structural unit is exemplified by a styrene monomer, an alkyl(meth)acrylate, a (meth)acrylate having an aromatic group, or the like.

The monomer that composes the hydrophilic structural unit is not particularly limited as long as it is a monomer having a hydrophilic group therein. The hydrophilic group is exemplified by a nonionic group, a carboxy group, a sulfonic acid group, a phosphoric acid group, and the like. Note that, the nonionic group is identical with the nonionic group in the self-dispersing polymer described later.

The hydrophilic structural unit in the present invention contains preferably at least carboxy group from the viewpoint of dispersion stability. An aspect in which the hydrophilic structural unit contains both nonionic group and carboxy group is also preferable.

Specific examples of the polymer pigment dispersant used in the present invention include: a copolymer of styrene and (meth)acrylic acid; a copolymer of styrene, (meth)acrylic acid, and (meth)acrylate; a copolymer of (meth)acrylate and (meth)acrylic acid; a copolymer of polyethyleneglycol (meth)acrylate and (meth)acrylic acid; and a copolymer of styrene and maleic acid.

Note that, "(meth)acrylic acid" denotes acrylic acid or methacrylic acid.

The polymer pigment dispersant in the present invention is, from the viewpoint of the dispersion stability of pigments, preferably a vinyl polymer that contains a carboxy group therein, and more preferably a vinyl polymer that contains therein as a hydrophobic structural unit at least a structural unit derived from a monomer that contains an aromatic group and as a hydrophilic structural unit a structural unit having a carboxy group.

The weight average molecular weight of the polymer pigment dispersant is, from the viewpoint of the dispersion stability of pigments, preferably from 3,000 to 200,000, more preferably from 5,000 to 100,000, still more preferably from 5,000 to 80,000, and particularly preferably from 10,000 to 60,000.

In the present invention, the content of the polymer pigment dispersant in the coloring particles is, from the viewpoints of the dispersability of pigments, the coloring properties of inks, and the dispersion stability, preferably from 5% by mass to 200% by mass, more preferably from 10% by mass to 100% by mass, and particularly preferably from 20% by mass to 80% by mass.

When the content of the polymer pigment dispersant in the coloring particles is within the above range, pigments are desirably covered with an appropriate amount of the dispersant, and desirably coloring particles having a small diameter and an excellent stability over time are likely to be obtained easily.

The coloring particles in the present invention may include the other dispersants in addition to the polymer pigment dispersant. For example, conventionally known water-soluble low molecular dispersants or water-soluble polymers are usable. The content of the dispersants other than the water-insoluble polymer dispersant may be within the range in which the water-insoluble polymer dispersant is used.

The coloring particles in the present invention are obtained by, for example, dispersing a mixture that contains a pigment serving as a colorant, the polymer pigment dispersant, if necessary, a solvent (preferably, a solvent that contains an organic solvent), and others with a dispersing machine.

The method of producing a dispersion of the coloring particles in the present invention includes the steps of preferably mixing a liquid that contains water as a main component, a pigment, the polymer pigment dispersant, an organic solvent capable of dissolving or dispersing the polymer pigment dispersant, and a basic substance (a mixing and hydration step), and then removing at least part of the organic solvent (a solvent removal step).

According to the method of producing a dispersion of the coloring particles, the coloring particles are finely dispersed, and a dispersion of the coloring particles having an excellent storage stability is allowed to be produced.

The organic solvent in the present invention is not particularly limited as long as it is capable of dissolving or dispersing the polymer pigment dispersant, but, in addition to that, it is preferable that the organic solvent has an affinity to water to a certain extent. In practice, an organic solvent having solubility in water of from 10% by mass to 50% by mass at 20° C. is preferable.

The dispersion of the coloring particles in the present invention may be produced, more specifically, through a method including the following steps (1) and (2), but the method is not limitative.

Step (1): a mixture that contains a pigment, the polymer pigment dispersant, an organic solvent capable of dissolving or dispersing the polymer pigment dispersant, a neutralizer (preferably, a basic substance), and water is subjected to a dispersing treatment. Step (2): at least part of the organic solvent is removed from the mixture.

In the step (1), at first, the polymer pigment dispersant is dissolved or dispersed in the organic solvent to obtain a mixture thereof (mixing process). Then, a solution that contains water as a main component, the pigment, and the neutralizer (preferably, a basic substance), water, and if necessary, a surfactant or the like are added to the mixture, and the resulting mixture is subjected to mixing and dispersing treatments so as to obtain an oil-in-water type dispersion of the coloring particles.

The addition amount (neutralization degree) of the neutralizer (preferably, a basic substance) is not particularly limited, but in general, the pH of the dispersion of the coloring particles that is finally obtained is preferably neutral, for example, from 4.5 to 10. Further, the pH may be also determined by the neutralization degree in accordance with the dispersant.

Upon producing the dispersion of the coloring particles, a kneading and dispersing treatment may be performed while a strong shearing force is applied with a twin-roll mill, a three-roll mill, a ball mill, a trommel, a disper mixer, a kneader, a co-kneader, a homogenizer, a blender, a uni- or bi-axial extruder, or the like.

Note that, the details of the kneading and dispersing treatment are described in "Paint Flow and Pigment Dispersion" by T. C. Patton (published by John Wiley and Sons, 1964), and others.

Further, if necessary, a fine dispersing treatment may be performed with the help of beads made of glass or zirconia having a particles size of from 0.01 mm to 1 mm, by using a vertical or lateral sand grinder, a pin mill, a slit mil, an ultrasonic wave disperser, or the like.

In the method of producing the dispersion of the coloring particles in the present invention, the step of removing the organic solvent is not particularly limited, but the organic solvent may be removed by conventionally known methods such as vacuum distillation.

The volume average particle diameter of the coloring particles in the present invention is, from the viewpoints of color reproducibility and light resistance, in the range of preferably from 10 nm to 200 nm and more preferably from 10 nm to 100 nm.

The particle size distribution of the coloring particles is not particularly limited, but it may be either or both of wide and mono-dispersed. The coloring particles may be used in a combination of two or more kinds thereof.

Note that, the volume average particle diameter and particle size distribution of the coloring particles are measurable with conventional light scattering methods.

The content of the coloring particles in the ink-jet ink composition of the present invention is, from the viewpoints of coloring properties, storage stability, and ejection properties of inks, preferably in the range of from 0.1% by mass to 20% by mass and more preferably from 0.5% by mass to 10% by mass.

(Polymer Particles)

The ink-jet ink composition of the present invention contains at least one kind of polymer particles. This brings an improvement in the fixability of an image formed, and an adequate scratch resistance is exhibited. Examples of the polymer particles in the present invention include polymer particles that are composed of a polymer such as a thermoplastic resin including acrylic, epoxy, polyurethane, polyether, polyamide, unsaturated polyester, phenol, silicone, and fluoro resin; a polyvinyl resin including vinyl chloride, vinyl acetate, polyvinyl alcohol, and polyvinyl butyral; a polyester resin including alkyd resin and phthalic acid resin; or a copolymer or mixture thereof.

The polymer particles in the present invention are, from the viewpoints of the dispersion stability and the ejection property, preferably self-dispersing polymer particles, and more preferably self-dispersing polymer particles that includes a hydrophilic structural unit and a hydrophobic structural unit.

In the present invention, the self-dispersing polymer is a water-insoluble polymer that is capable of being in a dispersed state in a water-based medium by an action of the functional group (particularly an acidic group or the salt thereof) that is incorporated in the polymer itself, when the polymer is dispersed in the presence of a surfactant through phase inversion emulsification.

Here, the "dispersed state" includes both an emulsified state (emulsion) in which the water-insoluble polymer is dispersed in a liquid state in a water-based medium and a suspended state (suspension) in which the water-insoluble polymer is dispersed in a solid state in a water-based medium.

The self-dispersing polymer in the present invention is preferably a self-dispersing polymer that is capable of being in a dispersed state in which the water-insoluble polymer is dispersed in a solid state.

As the method of providing the emulsifying or dispersing state of the self-dispersing polymer, namely as the method of preparing a water-based dispersion of the self-dispersing polymer, there may be mentioned the phase inversion emulsification. Examples of the phase inversion emulsification includes a method in which the self-dispersing polymer is dissolved or dispersed in a solvent (for example, a water-soluble organic solvent or the like); the resulting solution or dispersion is put into water while no surfactant is added thereto; then the solvent is removed by agitating and mixing the resulting mixture while the neutralized state of the salt forming group (for example, an acidic group) of the self-dispersing polymer is kept, so that a water-based dispersion in an emulsifying or dispersing state is obtained.

The stable emulsifying or dispersing state of the self-dispersing polymer denotes that when a solution dissolving 30 g of the water-insoluble polymer in 70 g of an organic solvent (for example, methylethyl ketone), a neutralizer (sodium hydroxide when the salt forming group is anionic, and acetic acid when the salt forming group is cationic) capable of neutralizing 100% of the salt forming group of the water-insoluble polymer, and 200 g of water are mixed and agitated (with an agitation machine with agitation propellers, at a revolution of 200 rpm, for 30 minutes, at 25° C.) and then the organic solvent is removed from the resulting mixed liquid, the resulting emulsifying or dispersing state remains stably for at least one week and no formation of precipitation is recognized by visual observation.

Further, the stability of the emulsifying or dispersing state of the self-dispersing polymer may be also confirmed by an accelerated sedimentation test with centrifugal separation. The stability confirmed by the sedimentation test with centrifugal separation is evaluated, for example, as: the water-based dispersion of polymer particles obtained by the method described above is conditioned in a manner that the solid content concentration thereof becomes 25% by mass; the dispersion is centrifugally separated for 1 hour at 12,000 rpm; and then the solid content concentration of the supernatant obtained after the centrifugal separation is measured.

When the ratio of the solid content concentration after centrifugal separation to the solid content concentration before centrifugal separation is large (a value close to 1), the polymer particles are hardly precipitated by centrifugal separation, namely, the water-based dispersion of the polymer particles is considered to be in a more stable state. In the present invention, the ratio of the solid content concentration before to after centrifugal separation is preferably 0.8 or more, more preferably 0.9 or more, and particularly preferably 0.95 or more.

Further, the water-insoluble polymer means such a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The self-dispersing polymer in the present invention is preferably characterized in that the content of a water-soluble component that exhibits its water soluble character in a dispersing state is preferably 10% by mass or less, more preferably 8% by mass or less, and still more preferably 6% by mass or less. When the water-soluble component is 10% by mass or less, swelling of the polymer particles and fusion among the polymer particles are effectively prevented, thereby still more improving the ejection stability in the ink-jet system.

Here, the water-soluble component is a compound that is included in the self-dispersion polymer and is dissolved in water when the self-dispersing polymer is in a dispersing state. The water-soluble component is a water-soluble compound that is by-produced or got mixed in when the self-dispersing polymer is produced.

The hydrophobic structural unit incorporated in the polymer that composes the polymer particles in the present invention is, from the viewpoints of fixability and blocking resistance of an image to be formed, includes preferably at least one kind of structural unit derived from a (meth)acryl monomer having a cyclic aliphatic group.

In the present invention, the (meth)acryl monomer having a cyclic aliphatic group (hereinafter, referred to as "alicyclic (meth)acrylate" in some cases) has such a structure in which a structural site derived from (meth)acrylic acid and a structural site derived from alcohols are incorporated and at least one non-substituted or substituted cyclic aliphatic group is incorporated in the structural site derived from alcohols. Note that, the cyclic aliphatic group may be the structural site itself that is derived from alcohols or may be linked to the structural site derived from alcohols through a linking group.

Note that, "(meth)acrylate" denotes methacrylate or acrylate.

The cyclic aliphatic group is not particularly limited as long as it includes a cyclic non-aromatic hydrocarbon group therein, and may include a bi-cyclic hydrocarbon and a polycyclic hydrocarbon having 3 or more rings.

Examples of the cyclic hydrocarbon group include: a cycloalkyl group such as a cyclopentyl group or a cyclohexyl group; a cycloalkenyl group; a bicycle hexyl group; a norbornyl group; an isobornyl group; a dicyclopentanyl group; a dicyclopentenyl group; an adamantly group; a decahydro naphthalenyl group; a perhydro fluorenyl group; a tricycle [$5.2.1.0^{2,6}$]decanyl group; and a bicycle[4.3.0]nonane.

The cyclic aliphatic group may further have a substitution group. Examples of the substitution group include: an alkyl group, an alkenyl group, an aryl group, an aralkyl group, an alkoxy group, a hydroxy group, a primary amino group, a secondary amino group, a tertiary amino group, an alkyl or aryl carbonyl group, and a cyano group.

The cyclic aliphatic group may further form a condensed ring.

The cyclic aliphatic group in the present invention is, from the viewpoints of viscosity and solubility, the carbon atom number of the cyclic aliphatic group portion is preferably from 5 to 20.

The linking group that links the cyclic aliphatic group and the structural site derived from alcohols is preferably an alkyl group, an alkenyl group, an alkylene group, an aralkyl group, an alkoxy group, a mono- or oligo-ethyleneglycol group, and a mono- or oligo-propyleneglycol group that have from 1 to 20 carbon atoms.

Specific examples of the alicyclic (meth)acrylate in the present invention are described below, but the present invention is in no way limited by those examples.

Examples of a single-ring (meth)acrylate include a cycloalkyl(meth)acrylate with a cycloalkyl group having from 3 to 10 carbon atoms such as cyclopropyl(meth)acrylate, cyclobutyl(meth)acrylate, cyclopentyl(meth)acrylate, cyclohexyl(meth)acrylate, cycloheptyl (meth)acrylate, cyclooctyl(meth)acrylate, cyclononyl(meth)acrylate, or cyclodecyl (meth)acrylate.

Examples of a bi-cyclo (meth)acrylate include isobornyl (meth)acrylate and norbornyl (meth)acrylate.

Examples of a tri-cyclo (meth)acrylate include adamantly (meth)acrylate, dicyclopentanyl (meth)acrylate, and dicyclopentenyloxyethyl (meth)acrylate.

These may be used singly or in a mixture of two or more kinds thereof.

Among these groups, from the viewpoints of the dispersion stability, fixability, and blocking resistance of the self-dispersing polymer particles, at least one kind selected from the bi-cyclic (meth)acrylate and the polycyclic (meth)acrylate having three or more rings is preferable, and at least one kind selected from isobornyl (meth)acrylate, adamantly (meth) acrylate, and dicyclopentanyl (meth)acrylate is more preferable.

In the present invention, the content of the structural unit derived from the alicyclic (meth)acrylate that is included in the polymer particles is, from the viewpoints of stability of self-dispersing state, stabilization of particle shape in a water-based medium brought about by hydrophobic interaction among the alicyclic hydrocarbon groups, and lowering in the amount of the water-soluble components brought about by adequate hydrophobization of the particles, preferably from 20% by mass to 90% by mass, more preferably from 40% by mass to 90% by mass, and particularly preferably from 50% by mass to 80% by mass.

When the content of the structural unit derived from the alicyclic (meth)acrylate is selected to be 20% by mass or more, the fixability and blocking resistance are improved. On the other hand, when the content of the structural unit derived from the alicyclic (meth)acrylate is selected to be 90% by mass or less, stability of the polymer particles is improved.

In the present invention, the polymer particles may be composed by further including if necessary, the other structural units in addition to the structural unit derived from the alicyclic (meth)acrylate that serves as the hydrophobic structural unit. The monomers that form the other structural units are not particularly limited as long as they are copolymerizable with the alicyclic (meth)acrylate and the hydrophilic group containing monomers described later. Known monomers are usable for the monomers.

Specific examples of the monomers (hereinafter, referred to as "the other copolymerizable monomers" in some cases) that form the other structural units include: an alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an aromatic ring containing (meth)acrylate such as benzyl (meth)acrylate or phenoxyethyl (meth)acrylate; styrenes such as styrene, α-methylstyrene, or chlorostyrene; a dialkylaminoalkyl (meth)acrylate such as dimethylaminoethyl (meth)acrylate; an N-hydroxyalkyl (meth)acrylamide such as N-hydroxymethyl (meth)acrylamide, N-hydroxyethyl (meth)acrylamide, or N-hydroxybutyl (meth)acrylamide; and a (meth)acrylamide such as an N-alkoxyalkyl (meth)acrylamide including N-methoxymethyl (meth)acrylamide, N-ethoxymethyl (meth)acrylamide, N-(n-, iso) butoxymethyl (meth)acrylamide, N-methoxyethyl (meth)acrylamide, N-ethoxyethyl (meth)acrylamide, and N-(n-, iso) butoxyethyl (meth)acrylamide.

Among these, from the viewpoints of flexibility of the polymer framework, easiness of controlling the glass transition temperature (Tg), and dispersion stability of the polymer particles, at least one kind of (meth)acrylate that has a chain alkyl group having from 1 to 8 carbon atoms is preferable, a (meth)acrylate that has a chain alkyl group having from 1 to 4 carbon atoms is more preferable, and methyl (meth)acrylate or ethyl (meth)acrylate is particularly preferable. Here, the chain alkyl group denotes a straight chain or branched alkyl group.

Further, in the present invention, an aromatic group containing (meth)acrylate is also preferably usable.

When the aromatic group containing (meth)acrylate is included in the other polymerizable monomers, from the viewpoint of dispersion stability of the self-dispersing polymer particles, the structural unit derived from the aromatic group containing (meth)acrylate is preferably 40% by mass or less, more preferably 30% by mass or less, and particularly preferably 20% by mass or less.

Further, when a styrene-type monomer is used as the other polymerizable monomers, from the viewpoint of dispersion stability of the self-dispersing polymer particles, the structural unit derived from the styrene-type monomer is preferably 20% by mass or less, more preferably 10% by mass or less, still more preferably 5% by mass or less, and an aspect of not including the structural unit derived from the styrene-type monomer is particularly preferable.

Note that, the styrene-type monomer includes styrene, a substituted styrene (α-styrene, chlorostyrene, or the like), and a styrene macromer having a polystyrene structural unit.

In the present invention, the other copolymerizable monomers may be used one kind singly or two or more kinds in combination.

When the polymer particles include the other structural units therein, the content of the other structural units is preferably from 10% by mass to 80% by mass, more preferably from 15% by mass to 75% by mass, and particularly preferably from 20% by mass to 70% by mass. When the monomers that compose the other structural units are used in a combination two or more kinds thereof, the total content thereof is preferably in the above range.

The hydrophilic structural unit that is included in the polymer particles in the present invention is not particularly limited as long as it is derived from a hydrophilic group containing monomer, and may be derived from one kind or two or more kinds of the hydrophilic group containing monomers. The hydrophilic group is not particularly limited and may be a dissociative group or a nonionic hydrophilic group.

In the present invention, the hydrophilic group is, from the viewpoints of promotion of self-dispersing and the stability of an emulsified or dispersed state formed, at least one kind of hydrophilic group is preferably a dissociative group, and more preferably an anionic dissociative group. Examples of the anionic dissociative group include a carboxy group, a phosphoric acid group, and a sulfonic acid group. Among these, from the viewpoint of the fixability of a resulting ink-jet ink composition, the carboxy group is particularly preferable.

The hydrophilic group-containing monomer in the invention is preferably a dissociative group-containing monomer and, preferably, a dissociative group-containing monomer having a dissociative group and an ethylenically unsaturated bond from the viewpoints of the self-dispersibility and the aggregation property.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinate, etc. Specific examples of the unsaturated sulfonic acid monomer include styrenesulfonic acid, 2-acrylamido-2-methylpropanesulfonic acid, 3-sulfopropyl (meth)acrylate, and bis(3-sulfopropyl) itaconate. Specific examples of the unsaturated phosphoric acid monomer include vinylphosphonic acid, vinylphosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred and, at least one of acrylic acid and methacrylic acid are more preferred from the viewpoints of dispersed stability and ejection stability.

Examples of the monomer having a nonionic hydrophilic group include: an ethylenic unsaturated monomer that contains a (poly)ethyleneoxide group or a poly(propyleneoxy) group such as 2-methoxyethylacrylate, 2-(2-methoxyethoxy)ethylacrylate, 2-(2-methoxyethoxy)ethylmethacrylate, ethoxytriethyleneglycol methacrylate, methoxypolyethyleneglycol (from 200 to 1,000 of molecular weight) monomethacrylate, or polyethyleneglycol (from 200 to 1,000 of molecular weight) monomethacrylate; and an ethylenic unsaturated monomer having a hydroxy group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate.

As the monomer having a nonionic hydrophilic group, an ethylenic unsaturated monomer having an alkylether terminal is more preferable than an ethylenic unsaturated monomer having a hydroxy terminal from the viewpoints of the particle stability and the content of water-soluble components.

The hydrophilic structural unit in the present invention is also preferably either of an aspect of containing only a hydrophilic unit that has an anionic dissociative group and an aspect of containing both of a hydrophilic structural that has an anionic dissociative group and a hydrophilic structural unit that has a nonionic hydrophilic group.

In addition, an aspect of containing two or more kinds of hydrophilic structural units that have an anionic dissociative group and an aspect of using in combination two or more kinds of a hydrophilic structural unit that has an anionic dissociative group and a hydrophilic structural unit that has a nonionic hydrophilic group are also preferable.

The content of the hydrophilic structural unit in the polymer particles is, from the viewpoints of viscosity and stability over time, preferably 25% by mass or less, more preferably from 1% by mass to 25% by mass, still more preferably from 2% by mass to 23% by mass, and particularly preferably from 4% by mass to 20% by mass.

When two or more kinds of the hydrophilic structural units are included, the total content of the hydrophilic structural units is preferably in the above range.

The content of the structural unit having an anionic dissociative group in the polymer particles is preferably in such a range in which an adequate acid value is attained.

Further, the content of the structural unit having a nonionic hydrophilic group is, from the viewpoints of ejection stability and stability over time, preferably from 0% by mass to 25% by mass, more preferably from 0% by mass to 20% by mass, and particularly preferably from 0% by mass to 15% by mass.

When the polymer particles include an anionic dissociative group therein, the acid value thereof (KOH mg/g) is, from the viewpoints of the self-dispersing property, the content of water-soluble components, and the fixability of an ink-jet ink composition formulated by using the polymer particles, preferably from 20 to 200, more preferably from 22 to 120, still more preferably from 25 to 100, and particularly preferably from 30 to 80. When the acid value is 20 or more, the particles are allowed to be dispersed more stably. When the acid value is 200 or less, the amount of the water-soluble components incorporated is allow to be reduced.

The polymer that composes the polymer particles in the present invention is, from the viewpoint of dispersion stability, preferably a polymer that is obtained by polymerizing at least three kinds of monomers including an alicyclic (meth)acrylate, the other copolymerizable monomers, and a hydrophilic group containing monomer, and more preferably a polymer that is obtained by polymerizing at least three kinds of monomers including an alicyclic (meth)acrylate, a (meth)acrylate that has a straight or branched chain alkyl group having from 1 to 8 carbon atoms, and a hydrophilic group containing monomer.

In the present invention, from the viewpoint of dispersion stability, an aspect of substantially not including a structural unit that has a (meth)acrylate having a straight or branched chain alkyl group having 9 or more carbon atoms and a substitution group that is derived from an aromatic group containing macro-monomer or the like and has a large hydrophobicity is preferable, and an aspect of not including at all the structural unit is more preferable.

The polymer that composes the polymer particles in the present invention may be a random copolymer in which each structural unit is incorporated randomly or a block copolymer in which each structural unit is incorporated regularly. Each structural unit of the block copolymer may be synthesized in any introduction order. The same structural unit may be used two or more times, but the random copolymer is preferable considering versatility and productivity.

A weight-average molecular weight of the polymer that is used in the self-dispersing polymer particles in the invention is, preferably, from 3,000 to 200,000 and, more preferably, from 10,000 to 200,000 and, further preferably, from 30,000 to 150,000. The amount of the water-soluble component can be suppressed effectively by defining the weight average molecular weight to 3,000 or more. Further, the self-dispersed stability can be increased by defining the weight average molecular weight to 200,000 or less.

The weight average molecular weight can be measured by gel permeation chromatography (GPC).

The glass transition temperature (Tg) of the polymer particles in the present invention is preferably from 40° C. to 180° C., more preferably from 60° C. to 170° C., and particularly preferably from 70° C. to 150° C. When the glass transition temperature is 40° C. or higher, the scratch resistance and blocking resistance of an image formed from the ink-jet ink composition become more adequate. When the glass transition temperature is 180° C. or lower, the scratch resistance of the image becomes more adequate.

The polymer particles in the present invention is composed of, from the viewpoint of hydrophilic and hydrophobic control of polymer, preferably a vinyl polymer that contains a structure derived from an alicyclic (meth)acrylate in a copolymerization ratio of from 20% by mass to 90% by mass, a structure derived from a dissociative group containing monomer, and at least one kind of structure derived from a (meth)acrylate with a chain alkyl group having from 1 to 8 carbon atoms, and has an acid value of from 20 to 120, a total hydrophilic structural unit content of 25% by mass or less, and a weight average molecular weight of from 3,000 to 200,000;

more preferably a vinyl polymer that contains a structure derived from a polycyclic (meth)acrylate, bi- or tri- or more cyclic, in a copolymerization ratio of 30% by mass or more and less than 90% by mass, a structure derived from a (meth)acrylate with a chain alkyl group having from 1 to 4 carbon atoms in a copolymerization ratio of 10% by mass or more and less than 70% by mass, and a structure derived from a carboxy group containing monomer in an acid value range of from 25 to 100, and has a total hydrophilic structural unit content of 25% by mass or less and a weight average molecular weight of from 10,000 to 200,000; and particularly preferably a vinyl polymer that contains a structure derived from a polycyclic (meth)acrylate, bi- or tri- or more cyclic, in a copolymerization ratio of 40% by mass or more and less than 80% by mass, a structure derived from methyl(meth)acrylate or ethyl(meth)acrylate in a copolymerization ratio of 20% by mass or more and less than 60% by mass, and a structure derived from acrylic acid or methacrylic acid in an acid value range of from 30 to 80, and has a total hydrophilic structural unit content of 25% by mass or less, and a weight average molecular weight of from 3,000 to 150,000.

As specific examples of the polymer particle that is used in the self-dispersing polymer particle exemplary compounds B-01 to B-13 are shown below but the invention is not limited to them. Numerical values described in each parenthesis represent the mass ratio of the copolymer components.

B-01: a methyl methacrylate/isobornyl methacrylate/methacrylic acid copolymer (40/52/8), B-02: a methyl methacrylate/isobornyl methacrylate/benzyl methacrylate/methacrylic acid copolymer (30/50/14/6), B-03: a methyl methacrylate/dicyclopentanyl methacrylate/methacrylic acid copolymer (40/50/10), B-04: a methyl methacrylate/dicyclopentanyl methacrylate/phenoxyethyl methacrylate/methacrylic acid copolymer (30/50/14/6), B-05: a methyl methacrylate/isobornyl methacrylate/methoxypolyethyleneglycol methacrylate (n=2)/methacrylic acid copolymer (30/54/10/6), B-06: a methyl methacrylate/dicyclopentanyl methacrylate/methoxypolyethyleneglycol methacrylate (n=2)/methacrylic acid copolymer (54/35/5/6), B-07: a methyl methacrylate/adamantly methacrylate/methoxypolyethyleneglycol methacrylate (n=23)/methacrylic acid copolymer (30/50/15/5), B-08: a methyl methacrylate/isobornyl methacrylate/dicyclopentanyl methacrylate/methacrylic acid copolymer (20/50/22/8), B-09: an ethyl methacrylate/cyclohexyl methacrylate/acrylic acid copolymer (50/45/5), B-10: an isobutyl methacrylate/cyclohexyl methacrylate/acrylic acid copolymer (40/50/10), B-11: an n-butyl methacrylate/cyclohexyl methacrylate/styrene/acrylic acid copolymer (30/55/10/5), B-12: a methyl methacrylate/dicyclopentenyloxyethyl methacrylate/methacrylic acid copolymer (40/52/8), and B-13: a lauryl methacrylate/dicyclopentenyloxyethyl methacrylate/methacrylic acid copolymer (25/65/10).

The method of producing the polymer particles (preferably, self-dispersing polymer particles) in the present invention is not particularly limited, but the polymer particles may be produced by copolymerizing a monomer mixture by conventionally known methods. Among the polymerization methods, from the viewpoint of droplet ejection stability of an ink-jet ink composition that is prepared from and includes the polymer particles, a method of polymerizing in an organic medium is more preferable, and the solution polymerization is particularly preferable.

In the method of producing the polymer particles in the present invention, a mixture that contains the monomer mixture and if necessary, an organic solvent and a radical polymerization initiator is subjected to copolymerization in an inert gas atmosphere so as to produce the water-insoluble polymer.

The method of producing a water-based dispersion of the self-dispersing polymer particles in the present invention is not particularly limited, but the water-based dispersion of the self-dispersing polymer particles may be obtained by conventionally known methods. The process of obtaining the water-based dispersion of the self-dispersing polymer is preferably a phase inversion emulsification that includes the following step (1) and step (2).

Step (1): a step of obtaining a dispersion by agitating a mixture that contains a water-insoluble polymer, an organic solvent, a neutralizer, and a water-based medium.

Step (2): a step of removing at least part of the organic solvent from the dispersion.

The step (1) is preferably a treatment that includes at first dissolving the polymer (water-insoluble polymer) in the organic solvent and then gradually adding the neutralizing agent and the aqueous medium, and mixing and stirring them to obtain a dispersion. By adding the neutralizing agent and the aqueous medium to the solution of the water-insoluble polymer dissolved in the organic solvent, self-dispersing polymer particles having a particle size that enables higher storage stability can be obtained without requiring strong sharing force.

The stirring method for the mixture is not particularly limited and a mixing and stirring apparatus that is used generally can be used, and if necessary, a disperser such as a ultrasonic disperser or a high pressure homogenizer can be used.

Preferable examples of the organic solvent include alcohol type solvents, ketone type solvents and ether type solvents.

Examples of the alcohol type solvent include isopropyl alcohol, n-butanol, t-butanol, and ethanol. Examples of the ketone type solvent include acetone, methyl ethyl ketone, diethyl ketone, and methyl isobutyl ketone. Examples of the ether type solvent include dibutyl ether and dioxane. Among the organic solvents, the ketone type solvent such as methyl ethyl ketone and the alcohol type solvent such as propyl alcohol are preferred. A combined use of isopropyl alcohol and methyl ethyl ketone is also preferred. By the combined use of the solvents, self-dispersing polymer particles of fine particle size with no aggregation settling or fusion between particles to each other and having high dispersed stability may be obtained. For example, this is because the change of polarity at the phase transfer from an oil system to an aqueous system is moderated, The neutralizer is used to neutralize part or all of the dissociative groups and to form a stabile emulsified or dispersed state of the self-dispersing polymer in water. When the self-dispersing polymer has an anionic dissociative group as the dissociative group, the neutralizer used herein is exemplified by a basic compound such as an organic amine compound, ammonia, or an alkali metal hydroxide. Examples of the organic amine compound include: monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include: lithium hydroxide, sodium hydroxide, and potassium hydroxide. Among these, from the viewpoint of dispersion stability of the self-dispersing polymer particles in water, sodium hydroxide, potassium hydroxide, triethylamine, and triethanolamine are preferable.

The basic compound is used in an amount of preferably from 5 mol % to 120 mol % with respect to 100 mol % of the dissociative group, more preferably from 20 mol % to 100 mol %, and still more preferably from 30 mol % to 80 mol %. In an amount of 15 mol % or more, an effect of stabilizing particle dispersion in water is exerted, and in an amount of 80 mol % or less, an effect of lowering the amount of the water-soluble components is exerted.

In the step (2), from the dispersion obtained in the step (1), a water-based dispersion of the self-dispersing polymer particles is obtained through phase inversion to a water-based system by way of distilling out the organic solvent through conventional processes such as vacuum distillation. The organic solvent in the resulting water-based dispersion is substantially removed, and the amount of the organic solvent is preferably 0.2% by mass or less and more preferably 0.1% by mass or less.

The average particle diameter of the self-dispersing polymer particles in the present invention is in the range of preferably from 1 nm to 100 nm, more preferably from 3 nm to 80 nm, still more preferably from 5 nm to 60 nm, and particularly preferably from 5 nm to 40 nm. At an average particle diameter of 1 nm or more, production adaptability is improved. At an average particle diameter of 100 nm or less, storage stability is improved.

Further, the particle size distribution of the self-dispersing polymer particles is not particularly limited, but either of a wide particle size distribution and a mono-dispersed particle size distribution may be acceptable. Two or more kinds of the water-insoluble particles may be used in a mixture.

Note that, the average particle diameter and the particle size distribution of the self-dispersing polymer particles may be measured by, for example, the light scattering method.

In the ink-jet ink composition of the present invention, the self-dispersing polymer particles are preferably in a formulation where no colorant is substantially included therein.

The self-dispersing polymer particles in the present invention are excellent in self-dispersing property, providing an extremely high stability when the polymer particles are dispersed by themselves. However, the function of the polymer particles as a dispersant dispersing a pigment stably is not so high, so that, for example, when the self-dispersing polymer particles of the present invention are in an ink formulation where a pigment is included therein, the stability of the resulting ink composition is largely lowered in some cases.

The ink-jet ink composition of the present invention may include the self-dispersing polymer particles one kind singly or in a combination two or more kinds thereof. The content of the self-dispersing polymer particles is, from the viewpoint of the gloss of resulting images, preferably from 1% by mass to 30% by mass, more preferably from 2% by mass to 20% by mass, and particularly preferably from 2% by mass to 10% by mass.

Further, the content ratio of the coloring particles to the self-dispersing polymer particles in the ink-jet ink composition of the present invention is, from the viewpoint of scratch resistance of resulting images, preferably from 1/0.5 to 1/10 and more preferably from 1/1 to 1/4.

(Hydrophilic Organic Solvent)

The ink-jet ink composition of the present invention includes at least one kind of hydrophilic organic solvent. In the present invention, in addition to the hydrophilic organic solvent, water serving as a solvent is further included preferably.

The hydrophilic organic solvent to form the ink composition is preferably an (alkyleneoxy)alcohol or an (alkyleneoxy) alkyl ether in the viewpoint of inhibiting curling. For the same purpose, the ink composition preferably contains two or more hydrophilic organic solvents, and when it contains two or more hydrophilic organic solvents, at least one of them is preferably an (alkyleneoxy)alcohol, and in particular, the two or more hydrophilic organic solvents preferably include at least one (alkyleneoxy)alcohol and at least one (alkyleneoxy) alkyl ether.

The (alkyleneoxy)alcohol is preferably (propyleneoxy)alcohol. Examples of (propyleneoxy)alcohol include "SANNIX GP250" and "SANNIX GP400" (trade names, both are manufactured by Sanyo Chemical Industries, Ltd.).

The (alkyleneoxy)alkyl ether is preferably an (ethyleneoxy)alkylether with an alkyl portion having from 1 to 4 carbon atoms or a (propyleneoxy)alkyl ether with an alkyl portion having from 1 to 4 carbon atoms. Examples of the (alkyleneoxy)alkyl ether include: ethyleneglycol monomethylether, ethyleneglycol monoethylether, ethyleneglycol monobutylether, diethyleneglycol monomethylether, diethyleneglycol monobutylether, propyleneglycol monomethylether, propyleneglycol monobutylether, dipropyleneglycol monomethylether, triethyleneglycol monomethylether, ethyleneglycol diacetate, ethyleneglycol monomethylether acetate, triethyleneglycol monomethylether, triethyleneglycol monoethylether, tripropyleneglycol monomethylether, tripropyleneglycol monoethylether, and ethyleneglycol monophenylether.

In the invention, the polymer particles are preferably self-dispersing polymer particles, and the hydrophilic organic solvent is preferably a (propyleneoxy)alcohol and an (ethyleneoxy)alkyl ether (with an alkyl moiety of 1 to 4 carbon atoms) and/or a (propyleneoxy)alkyl ether (with an alkyl moiety of 1 to 4 carbon atoms). More preferably, the polymer particles are self-dispersing polymer particles containing a water-insoluble polymer having a hydrophilic constituent unit and a constituent unit derived from an aromatic group-containing monomer, and the hydrophilic organic solvent is a (propyleneoxy)alcohol and an (ethyleneoxy)alkyl ether (with an alkyl moiety of 1 to 4 carbon atoms) and/or a (propyleneoxy)alkyl ether (with an alkyl moiety of 1 to 4 carbon atoms).

In addition to the hydrophilic organic solvent, if necessary, any other organic solvent may be added for the purpose of preventing dryness, enhancing penetration, controlling viscosity, or the like.

A certain organic solvent used as an anti-drying agent can be effectively prevent nozzle clogging, which could otherwise be caused by the ink dried in the ink discharge port in the process of discharging the ink composition by ink-jet method for image recording.

For the prevention of drying, a hydrophilic organic solvent having a vapor pressure lower than that of water is preferably used. Examples of hydrophilic organic solvents suitable for the prevention of drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane, heterocyclic compounds such as 2-pyrrolidone, N-methyl-2-pyrrolidone, 1,3-dimethyl-2-imidazolidinone, and N-ethylmorpholine, sulfur-containing compounds such as sulfolane, dimethylsulfoxide and 3-sulfolene, polyfunctional compounds such as diacetone alcohol and diethanolamine, and urea derivatives. In particular, polyhydric alcohols such as glycerin and diethylene glycol are preferred.

In order to enhance the penetration, an organic solvent may be used for better penetration of the ink composition into recording media. Examples of organic solvents suitable for penetration enhancement include alcohols such as ethanol, isopropanol, butanol, and 1,2-hexanediol, sodium lauryl sulfate, sodium oleate, and nonionic surfactants.

Besides the above, a hydrophilic organic solvent may also be used to control viscosity. Examples of hydrophilic organic solvents that may be used to control viscosity include alcohols (e.g., methanol, ethanol and propanol), amines (e.g., ethanolamine, diethanolamine, triethanolamine, ethylenediamine, and diethylenetriamine), and other polar solvents (e.g., formamide, N,N-dimethylformamide, N,N-dimethylacetamide, dimethylsulfoxide, sulfolane, 2-pyrrolidone, acetonitrile, and acetone).

(Water)

The ink composition used in the invention preferably includes water. There is no limitation for the content of water. The liquid composition may preferably contains water in an amount of 10% by mass to 99% by mass, more preferably from 30% by mass to 80% by mass, and still more preferably 50% by mass to 70% by mass.

(Other Additives)

The ink composition may if necessary, contain other additives, in addition to the components described above. Examples of other additives that may be used in the invention include conventional additives such as a color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersed stabilizer, anti-rust agent and chelating agent. Those various additives may directly be added after preparation of the ink composition, or may be added at the time of preparation of the ink composition. Specifically, the other additives described in the paragraph numbers of from [0153] to [0162] in JP-A No. 2007-100071 are included.

Examples of the surface tension regulator include nonionic surfactants, cationic surfactants, anionic surfactants, and betaine type surfactants.

For smooth ejection in ink-jet methods, the amount of addition of the surface tension regulator is preferably such that the surface tension of the ink composition can be adjusted in the range of from 20 mN/m to 60 mN/m, more preferably from 20 mN/m to 45 mN/m, further preferably from 25 mN/m to 40 mN/m. When the ink is applied by methods other than ink-jet methods, the amount of addition of the surface tension regulator is preferably such that the surface tension of the ink composition can be adjusted in the range of from 20 mN/m to 60 mN/m, more preferably from 30 mN/m to 50 mN/m.

The surface tension of the ink composition may be measured by a plate method using Automatic Surface Tensiometer CBVP-Z (trade name, manufactured by Kyowa Interface Science Co., LTD.) under 25° C. conditions.

Preferred examples of the surfactant include hydrocarbon anionic surfactants such as fatty acid salts, alkyl sulfuric acid ester salts, alkyl benzenesulfonates, alkyl naphthalenesulfonates, dialkyl sulfosuccinates, alkyl phosphonic acid ester salts, naphthalenesulfonic acid-formalin condensates, and polyoxyethylene alkyl sulfuric acid ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerine fatty acid esters, and oxyethylene-oxypropylene block copolymers. Acetylene polyoxyethylene oxide surfactants SURFYNOLs (trade name, manufactured by Air Products & Chemicals, Inc.) and Orfin E1010 (trade name, manufactured by Nissin Chemical Industry Co., Ltd.) are also preferably used. Amine oxide type amphoteric surfactants such as N,N-dimethyl-N-alkylamine oxide are also preferred.

In addition, the surfactants listed in pages 37 to 38 of JP-A No. 59-157636 and Research Disclosure No. 308119 (1989) may also be used.

Fluorocarbon (alkyl fluoride type) surfactants or silicone surfactants as described in JP-A Nos. 2003-322926, 2004-325707 and 2004-309806 may be used to improve scratch resistance.

The surface tension regulator may also be used as a defoamer, and fluoride compounds, silicone compounds, and chelating agents such as EDTA may also be used.

The viscosity of the ink composition is preferably in the range of from 1 mPa·s to 30 mPa·s, more preferably from 1 mPa·s to 20 mPa·s, further preferably from 2 mPa·s to 15 mPa·s, particularly preferably from 2 mPa·s to 10 mPa·s, from the viewpoints of ejection stability and the aggregation rate upon contact between the ink composition and the treatment liquid. When the ink composition is applied by methods other than ink-jet methods, the viscosity of the ink composition is preferably in the range of from 1 mPa·s to 40 mPa·s, more preferably from 5 mPa·s to 20 mPa·s.

For example, the viscosity of the ink composition may be measured using a Brookfield viscometer at 20° C.

(Ink Set)

The ink set of the present invention is composed of at least one kind of ink-jet ink composition of the present invention and at least one kind of treatment liquid capable of forming an aggregate when the treatment liquid contacts with the ink-jet ink composition.

The details of the ink composition are as mentioned previously.

In the present invention, the ink-jet ink composition includes at least one kind selected from the water-soluble acidic compound and the salt thereof, so that the dot diameter difference diameters between a primary color dot and a secondary color dot is allowed to be minimized.

(Treatment Liquid)

In the invention, the treatment liquid is prepared so as to forms an aggregate when contacted with the ink-jet ink composition. Specifically, the treatment liquid preferably contains at least an aggregating component capable of aggregating the dispersed particles in the ink composition, such as the coloring material particles (such as a pigment) and forming an aggregate. If necessary, the treatment liquid may be prepared using any other component. The use of the ink composition in combination with the treatment liquid allows faster ink-jet recording and also allows the formation of images with high density and resolution and high drawing quality (such as reproducibility of fine lines or portions) even in high-speed recording.

(Aggregating Component)

The treatment liquid may contain at least one aggregating component that forms an aggregate when contacted with the ink composition. Mixing the treatment liquid with the ink composition ejected by ink-jet method promotes aggregation of the pigment or the like, which is stably dispersed in the ink composition.

Examples of the treatment liquid include a liquid forming an aggregate at the liquid composition by changing the pH of the liquid composition. The pH of the treatment liquid (at 25° C.±1° C.) is, preferably, from 1 to 6, more preferably, from 2 to 5 and, further preferably, from 3 to 5, from the viewpoint of the aggregation rate of the liquid composition. In this case, the pH of the liquid composition (at 25° C.±1° C.) used in the ejection step is, preferably, 7.5 or higher (more preferably, 8 or higher).

Among all, in the invention, it is preferred that the pH of the liquid composition (at 25° C.) is 7.5 or higher and the pH of the treatment liquid (at 25° C.) is preferably from 3 to 5, from the viewpoint of the image density, the resolution and increase in the ink-jet recording speed.

The aggregating component can be used alone or two or more of components can be used in admixture.

The treatment liquid may be prepared using at least one acidic compound as the aggregating component. Acidic compounds that may be used include compounds having a phosphate group, a phosphonate group, a phosphinate group, a sulfate group, a sulfonate group, a sulfinate group, or a carboxy group, or salts thereof (such as polyvalent metal salts). Particularly, in view of the aggregation rate of the ink composition, compounds having a phosphate group or a carboxy group are more preferred, and compounds having a carboxy group is further preferred.

The carboxy group-containing compound is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, ortho-phosphoric acid, pyrrolidone carboxylic acid, pyrone carboxylic acid, pyrrole carboxylic acid, furancarboxylic acid, pyridinecarboxylic acid, coumaric acid, thiophencarboxylic acid, nicotinic acid, derivatives of these compounds, or salts thereof (such as polyvalent metal salts). One or more of these compounds may be used alone or in any combination.

As the treatment liquid, a treatment liquid to which polyvalent metal salts serving as aggregating components are added may be also included. These aggregating components are also capable of improving a high speed aggregating performance. Examples of the polyvalent metal salts include: the salts of an alkaline earth metal (for example, magnesium and calcium) that belongs to the group 2 in the periodic table; the salts of a transition metal (for example, lanthanum) that belongs to group 3 in the periodic table; and the salts of lanthanides (for example, neodymium). As the metal salts, carboxylic acid salts (formic acid salts, acetic acid salts, benzoic acid salts, or the like), nitric acid salts, chlorides, and thiocyanic acid salts are preferable. Among these, the calcium or magnesium salts of carboxylic acids (formic acid, acetic acid, benzoic acid, or the like), the calcium or magnesium salts of nitric acid, and the calcium or magnesium salts of thiocyanic acid are preferable.

From the viewpoint of the aggregating effect, the content of the metal salt in the treatment liquid is preferably from 1% by mass to 10% by mass, more preferably from 1.5% by mass to 7% by mass, further preferably from 2% by mass to 6% by mass.

The treatment liquid may be prepared using at least one cationic organic compound as the aggregating component. Examples of the cationic organic compound include cationic polymers such as poly(vinylpyridine) salts, polyalkylaminoethyl acrylate, polyaklylaminoethyl methacrylate, poly(vinylimidazole), polyethyleneimine, polybiguanide, polyguanide, and polyallyamine, and derivatives thereof.

From the viewpoint of the viscosity of the treatment liquid, the weight average molecular weight of the cationic polymer is preferably as low as possible. When the treatment liquid is applied to the recording medium by ink-jet method, the weight average molecular weight is preferably in the range of from 1,000 to 500,000, more preferably from 1,500 to 200,000, further preferably from 2,000 to 100,000. A weight average molecular weight of 1,000 or more is advantageous from the viewpoint of the aggregation rate, and a weight average molecular weight of 500,000 or less is advantageous from the viewpoint of ejection reliability. However, this does not always apply to cases where the treatment liquid is applied to the recording medium by methods other than ink-jet methods The cationic organic compound is also preferably a primary, secondary or tertiary amine salt type compound. Examples of such an amine salt type compound include cationic compounds such as hydrochlorides or acetates of compounds (e.g., laurylamine, coconut amine, stearylamine, and rosin amine), quaternary ammonium salt type compounds (e.g., lauryltrimethylammonium chloride, cetyltrimethylammonium chloride, lauryldimethylbenzylammonium chloride, benzyltributylammonium chloride, and benzalkonium chloride), pyridinium salt type compounds (e.g., cetylpyridinium chloride and cetylpyridinium bromide), imidazoline type cationic compounds (e.g., 2-heptadecenyl-hydroxyethylimidazoline), higher alkylamine ethylene oxide adducts (e.g., dihydroxyethylstearylamine); and amphoteric surfactants capable of being cationic in the desired pH range, such as amino acid type amphoteric surfactants, R—NH—$CH_2CH_2$—COOH type compounds (R represents alkyl group or the like), carboxylate type amphoteric surfactants (e.g., stearyl dimethyl betaine and lauryl dihydroxyethyl betaine), and sulfate type, sulfonate type, or phosphate type amphoteric surfactants.

In particular, divalent or polyvalent cationic organic compounds are preferred.

From the viewpoint of the aggregating effect, the content of the cationic organic compound in the treatment liquid is preferably from 1% by mass to 50% by mass, more preferably from 2% by mass to 30% by mass.

Above all, the aggregating component is preferably a divalent or polyvalent carboxylic acid or a divalent or polyvalent cationic organic compound from the viewpoints of the aggregation property and the scratch resistance of images.

From the viewpoint of the aggregation rate of the ink composition, the viscosity of the treatment liquid is preferably in the range of from 1 mPa·s to 30 mPa·s, more preferably from 1 mPa·s to 20 mPa·s, further preferably from 2 mPa·s to 15 mPa·s, particularly preferably from 2 mPa·s to 10 mPa·s. The viscosity may be measured using VISCOMETER TV-22 (trade name, manufactured by TOKI SANGYO CO., LTD.) under 20° C. conditions.

From the viewpoint of the aggregation rate of the ink composition, the surface tension of the treatment liquid is preferably from 20 mN/m to 60 mN/m, more preferably from 20 mN/m to 45 mN/m, further preferably from 25 mN/m to 40 mN/m. The surface tension may be measured using Automatic Surface Tensiometer CBVP-Z (trade name, manufactured by Kyowa Interface Science Co., LTD.) under 25° C. conditions.

(Other Components)

In the invention, the treatment liquid may generally contain a water-soluble organic solvent in addition to the aggregating component. The treatment liquid may also be prepared using other various additives, as long as the effects of the invention are not impaired. The details of the water-soluble organic solvent may be the same as those described above for the ink composition.

Examples of the other additives include conventional additives such as anti-drying agent (moistening agent), a color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersion stabilizer, anti-rust agent, and chelating agent. The examples listed above for the other additives contained in the ink composition may also be used.

<Ink-Jet Recording Method>

The ink-jet image forming method of the invention includes at least the steps of: applying the ink composition of the invention to a recording medium by an ink-jet method; and applying, to the recording medium, a treatment liquid capable of forming an aggregate upon contact with the ink composition. If necessary, the ink-jet recording method of the invention may further include any other steps.

In the present invention, the ink-jet ink composition includes at least one kind selected from the water-soluble acidic compound and the salt thereof, so that when a dot of a secondary color is formed on an image of a primary color, the dot diameter of the secondary color is effectively prevented from being widened with respect to the dot diameter of the primary color.

A description is given below of each step of the ink-jet recording method of the invention.

<Ink Applying Step>

The ink applying step is the step of applying the ink composition of the invention to a recording medium by an ink-jet method. In this step, the ink composition may be selectively applied to the recording medium so that the desired visible image can be formed. Each component of the ink composition of the invention and exemplary embodiments have been described in detail above.

Image recording utilizing the ink-jet method can be performed, specifically, by supplying energy thereby ejecting a liquid composition to a desired recording medium, that is, plain paper, resin-coated paper, paper used exclusively for ink-jet recording described, for example, in JP-A Nos. 8-169172, 8-27693, 2-276670, 7-276789, 9-323475, 62-238783, 10-153989, 10-217473, 10-235995, 10-337947, 10-217597, and 10-337947, films, common use paper for electrophotography, clothes, glass, metals, ceramics, etc. As the ink-jet recording method suitable to the invention, a method described in JP-A No. 2003-306623, in columns (0093) to (0105) may be applicable.

The ink-jet method is not particularly limited and may be of any known system, for example, a charge control system of ejecting an ink utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink utilizing a radiation pressure, and a thermal ink-jet system of heating an ink to form bubbles and utilizing the resultant pressure (BUBBLEJET (registered trade mark)). Examples of the ink-jet method include a system of injecting a number of ink droplets of low concentration, a so-called "photo-ink" each in a small volume, a system of improving an image quality using plural inks of a substantially identical hue and of different concentrations, and a system of using a colorless transparent ink.

The ink-jet head used in the ink-jet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal ink-jet type, BUBBLEJET (registered trade mark) type, etc.), an electrostatic attraction system (for example, electric field control type, and slit jet type, etc.), and an electric discharge system (for example, spark jet type, etc.) and any of the ejection systems may be used.

Ink nozzles, etc. used for recording by the ink-jet method are not particularly limited but can be selected properly depending on the purpose.

Examples of the ink-jet head include an ink-jet head of a shuttle system in which a short serial head is used and recording is performed while allowing the head to scan in the lateral direction of a recording medium, and an ink jet head of a line system in which a line head in which recording elements are arranged corresponding to the entire region for one side of a recording medium is used. In the line system, an image can be recorded over the entire surface of the recording medium by allowing the recording medium to be scanned in the direction orthogonal with the direction of arranging the recording elements, in which a transportation system such as a carriage by which the short head moves for scanning is not necessary. Further, since complicate scanning control for the movement of the carriage and the recording medium is not necessary and only the recording medium is moved, higher recording speed can be attained as compared with the shuttle system. While the ink-jet recording method of the invention is applicable to any one of them, the effect of improving the ejection accuracy and the scratch resistance of the image is generally remarkable when the ink-jet recording method is applied to the line system without performing dummy jetting.

The ink applying step according to the invention may be performed in the line system. In this case, a single ink composition or two or more ink compositions may be used. When two or more ink compositions are used, the time interval between preceding ejection (deposition) of an ink composition (the n-th color ($n \geqq 1$), for example, the second color) and immediately succeeding ejection (deposition) of another ink composition (the (n+1)-th color, for example, the third color) may be set to one second or less, in which good recording can be performed. According to the invention, at an ejection interval of one second or less in the line system, images having good scratch resistance and being less likely to cause blocking can be obtained by high speed recording at a speed equal to or higher than the conventional one, while running or color mixing is prevented, which would otherwise be caused by interference between ink droplets. In addition, images with a high level of hue quality and drawing quality (reproducibility of fine lines and portions in the images) can also be obtained.

In order to form high definition images, the amount of an ink droplet ejected from an ink-jet head is preferably from 0.5 pl to 6 pl (picoliters), more preferably from 1 pl to 5 pl, further preferably from 2 pl to 4 pl.

<Treatment Liquid Applying Step>

In the treatment liquid applying step, the treatment liquid capable of forming an aggregate upon contact with the ink composition is applied to the recording medium, so that it is brought into contact with the ink composition with each other to form an image. In this step, the dispersed particles in the ink composition, such as the polymer particles and the coloring material (e.g., a pigment), are aggregated to form an image fixed on the recording medium. Each component of the treatment liquid and exemplary embodiments has been described in detail above.

The treatment liquid may be applied using conventional methods such as coating methods, ink-jet methods and immersion methods. Coating methods may be performed using a bar coater, an extrusion die coater, an air doctor coater, a bread coater, a rod coater, a knife coater, a squeeze coater, a reverse roll coater, a bar coater, or the like, according to conventional coating methods. Ink-jet methods have been described in detail above.

The treatment liquid applying step may be performed before or after the ink applying step using the ink composition.

In the present invention, an aspect of performing the ink applying step after the treatment liquid is applied in the treatment liquid applying step is preferable. Namely, an aspect of preliminary applying the treatment liquid that serves to aggregate a coloring material (preferably a pigment) contained in the ink composition before the ink composition is applied onto a recording medium, and then applying the ink composition in a manner that the ink composition contacts with the treatment liquid applied onto the recording medium so as to develop an image is preferable. This allows ink-jet recording to be performed at a high speed, providing an image with high density and a high resolution even at a high recording speed.

The amount of application of the treatment liquid is preferably such that the aggregating component (e.g., a divalent or polyvalent carboxylic acid or a divalent or polyvalent cationic organic compound) can be applied in an amount of 0.1 g/m$^2$ or more, while it is not particularly limited as long as the ink composition can be aggregated. In particular, the aggregating component is preferably applied in an amount of from 0.1 g/m² to 1.0 g/m², more preferably from 0.2 g/m² to 0.8 g/m². When the amount of application of the aggregating component is 0.1 g/m² or more, the aggregation reaction can proceed well. When it is 1.0 g/m² or less, the glossiness will not become too high, which is preferred.

In the invention, the ink applying step is preferably performed after the treatment liquid applying step. In a preferred mode, the treatment liquid is applied to the recording medium, and then the step of drying the treatment liquid on the recording medium by heating is performed before the ink composition is applied. When the treatment liquid is previously dried by heating before the ink applying step, running and so on can be prevented, so that the coloring ability of the ink can be improved, which allows visible image recording with good color density and hue.

The drying by heating may be performed using conventional heating means such as a heater, air blowing means such as a drier, or a combination thereof. For example, the heating method may be a method of applying heat from a heater or the like to the opposite side of the recording medium from the treatment liquid-coated side, a method of applying warm air or hot air to the treatment liquid-coated side of the recording medium, a method of heating with an infrared heater, or any combination thereof.

<Thermally Fixing Step>

The ink-jet recording method of the invention preferably further includes the step of bringing a heating surface into contact with the ink image formed by the application of the ink composition to thermally fix the ink image. The thermally fixing treatment facilitates the fixation of the image on the recording medium, so that the scratch resistance of the image can be further improved.

The heating is preferably applied at a temperature equal to or higher than the glass transition temperature (Tg) of the polymer particles in the image. Since the polymer particles are heated to a temperature equal to or higher than the glass transition temperature (Tg), they can be formed into a film to strengthen the image. The heating temperature is, preferably, in a temperature range of Tg+10° C. or higher. Specifically, the heating temperature is preferably in a range from 40° C. to 150° C., more preferably, in a range from 50° C. to 100° C. and, further preferably, in a range from 60° C. to 90° C.

For surface smoothing, the pressure applied together with the heat is preferably in the range of from 0.1 MPa to 3.0 MPa, more preferably from 0.1 MPa to 1.0 MPa, further preferably from 0.1 MPa to 0.5 MPa.

Preferred examples of the heating method include, but are not limited to, a method of heating with a heating element such as a Nichrome wire heater, a method of supplying warm or hot air, a method of heating with a halogen lamp, an infrared lamp, or the like, and a non-contact drying method. Preferred examples of the method of applying heat and pressure include, but are not limited to, methods of fixing by contact heating, such as a method of pressing a heating plate against the image-forming side of the recording medium and a method including: providing a heating and pressurizing apparatus that includes a pair of heating and pressurizing rollers, a pair of heating and pressurizing belts, or a heating and pressurizing belt placed on the image recording side of the recording medium and a holding roller placed on the opposite side; and allowing the recording medium to pass between the pair of rollers or the like.

In a case of applying heat and pressure, a preferred nip time is from 1 msec to 10 sec, more preferably, from 2 msec to 1 sec and, further preferably, from 4 msec to 100 sec. Further, a nip width is, preferably, from 0.1 mm to 100 mm, more preferably, from 0.5 mm to 50 mm and, further preferably, from 1 mm to 10 mm.

The heating and pressurizing roller may be a metal roller made of metal or include a metal core and an elastic material coating layer provided around the core, or if necessary, a surface layer (also referred to as "release layer"). In the latter case, for example, the metal core may be a cylindrical member made of iron, aluminum, SUS, or the like, and at least part of the surface of the metal core is preferably covered with the coating layer. In particular, the coating layer is preferably made of a silicone resin or fluororesin having releasability. A heating element is preferably incorporated in the metal core of one of the heating and pressurizing rollers. The recording medium may be allowed to pass between the rollers so that heating and pressurizing can be performed at the same time, or if necessary, two heating rollers may be used to heat the recording medium between them. For example, the heating element is preferably a halogen lamp heater, a ceramic heater, a Nichrome wire heater, or the like.

The belt substrate to form the heating and pressurizing belt for use in the heating and pressurizing apparatus is preferably a seamless electroformed nickel substrate, and the thickness of the substrate is preferably from 10 μm to 100 μm. Besides nickel, aluminum, iron, polyethylene, or the like may also be used to form the belt substrate. When the silicone resin or fluororesin is used, the layer made of the resin preferably has a thickness of from 1 μm to 50 μm, more preferably from 10 μm to 30 μm.

The pressure (nip pressure) may be attained, for example, by selecting a resilient member such as a spring having a tension and disposing the resilient member on both roller ends of the heating and pressurizing rollers such that a desired nip pressure is obtained taking the nip gap into consideration.

The transporting speed of the recording medium in a case of using the heating and pressurizing roller or the heating and pressurizing belt is, preferably, in a range from 200 mm/sec to 700 mm/sec, more preferably, from 300 mm/sec to 650 mm/sec and, further preferably, from 400 mm/sec to 600 mm/sec.

<Recording Medium>

In the ink-jet recording method of the invention, the image is recorded on a recording medium.

The recording medium to be used may be, but not limited to, a sheet of cellulose-based general printing paper, such as so-called high-quality paper, coated paper, or art paper, for use in general offset printing. When cellulose-based general printing paper is used in image recording by general ink-jet method with aqueous ink, the ink may be absorbed and dried relatively slowly so that the coloring material may be more likely to migrate after the deposition, which may easily lead to image quality degradation. According to the ink-jet recording method of the invention, however, the migration of the coloring material can be suppressed so that high-quality image recording with good color density and hue can be achieved.

Generally commercially available recording media may be used, examples of which include wood free paper (A) such as OK Prince High-Quality (trade name) manufactured by Oji paper Co., Ltd., Shiorai (trade name) manufactured by Nippon Paper Industries Co., Ltd. and New NPI High-Quality (trade name) manufactured by Nippon Paper Industries Co., Ltd.; lightly coated paper such as OK Ever Light Coat (trade name) manufactured by Oji paper Co., Ltd. and Aurora S (trade name) manufactured by Nippon Paper Industries Co., Ltd.; lightweight coated paper (A3) such as OK Coat L (trade name) manufactured by Oji paper Co., Ltd. and Aurora L (trade name) manufactured by Nippon Paper Industries Co., Ltd.; coated paper (A2, B2) such as OK Top Coat+(trade name) manufactured by Oji paper Co., Ltd. and Aurora Coat (trade name) manufactured by Nippon Paper Industries Co., Ltd.; and art paper (A1) such as OK Kanafuji+(trade name) manufactured by Oji paper Co., Ltd. and Tokuhishi Art (trade name) manufactured by Mitsubishi Papers Mills Ltd. Various types of photo paper for ink-jet recording may also be used.

In particular, the effect of suppressing coloring material migration should be relatively large, and high-quality images with better color intensity and hue than the conventional ones should be obtained. From this point of view, the recording medium preferably has a water absorption coefficient Ka of from $0.05$ mL/m$^2$·ms$^{1/2}$ to $0.5$ mL/m$^2$·ms$^{1/2}$, more preferably from $0.1$ mL/m$^2$·ms$^{1/2}$ to $0.4$ mL/m$^2$·ms$^{1/2}$, further preferably from $0.2$ mL/m$^2$·ms$^{1/2}$ to $0.3$ mL/m$^2$·m$^{1/2}$.

The water absorption coefficient Ka has the same meaning as the one described in the JAPAN TAPPI pulp and paper test method No. 51:2000 (published by Japan Technical Association of the Pulp and Paper Industry). In practice, the water absorption coefficient Ka is calculated from the difference in the amount of transferred water between at a contact time of 100 ms and at a contact time of 900 ms as measured with an automatic scanning liquid absorptometer KM500win (trade name, manufactured by Kumagai Riki Kogyo Co., Ltd.).

Among the recording medium, a coated paper sheet for use in general offset printing is particularly preferred. Coated paper is produced by applying a coating material to the surface of non-surface-treated cellulose-based general wood-free paper, neutralized paper or the like so that a coating layer can be formed thereon. In general aqueous ink-jet image forming, coated paper may be more likely to cause problems with quality such as image glossiness or scratch resistance. In the ink-jet recording method of the invention, however, uneven glossiness can be reduced, and images with good glossiness and scratch resistance can be obtained. In particular, coated paper including base paper and a coating layer containing kaolin and/or calcium bicarbonate is preferably used. More specifically, art paper, coated paper, lightweight coated paper, or lightly coated paper is more preferred.

EXAMPLES

Hereinafter, the present invention will be further described in detail with reference to the following examples, but it should be construed that the invention is in no way limited to those examples. Note that, if not otherwise specified, "part(s)" and "%" are on the basis of mass.

The weight average molecular weight was measured by gel permeation chromatography (GPC). In GPC, HLC-8220GPC (trade name, manufactured by Tosoh Corporation) was used, and 3 pieces of columns, TSKgel Super HZM-H, TSKgel SuperHZ 4000, and TSKgel SuperHZ 2000, connected in series (trade name, all manufactured by Tosoh Corporation) were used as the column, and THF (tetrahydrofuran) was used as an eluate. Further, the measurement was performed by using an RI detector under the conditions at a sample concentration of 0.35% by mass, a flow rate of 0.35 mL/min, a sample ejection amount of 10 μL, and a measuring temperature of 40° C. A calibration curve was prepared based on eight samples of "standard sample TSK: standard, polystyrene" of "F-40", "F-20", "F-4", "F-1", "A-5000", "A-2500", "A-1000", and "n-propylbenzene" manufactured by Tosoh Corporation.

<Preparation of Ink-Jet Ink Composition>
(Synthesis of Polymer Pigment Dispersant P-1)

As described below, a polymer pigment dispersant P-1 (a phenoxyethyl methacrylate/methyl methacrylate/methacrylic acid copolymer (50/11/39 by mass ratio) was synthesized.

In a 1000 mL three-necked flask equipped with an agitator and a condenser tube, 88 g of methylethylketone were charged and heated at 72° C. in a nitrogen gas atmosphere; and a solution in which 0.85 g of 2,2'-azobisisobutylate, 50 g of benzyl methacrylate, 11 g of methacrylic acid, and 39 g of methyl methacrylate were dissolved in 50 g of methylethylketone was dropped into the flask over 3 hours. After the dropping was completed, the resulting mixture was further reacted for 1 hour, and then a solution in which 0.42 g of 2,2'-azobisisobutylate in was dissolved 2 g of methylethylketone was added. The temperature of the mixture was raised to 78° C. and the mixture was heated at 78° C. for 4 hours. The resulting reaction solution was re-precipitated twice in an excessively large amount of hexane. The precipitated resin was dried to obtain 96 g of the polymer pigment dispersant P-1.

The composition of the obtained resin was confirmed by $^1$H-NMR. The weight average molecular weight evaluated by GPC was 44,600. The acid value evaluated by the method described in the JIS standard (JIS K0070:1992) was 86 mgKOH/g.

(Preparation of Cyan Pigment Dispersion C1)

Pigment Blue 15:3 ("PHTHALOCYANINE BLUE A220" (trade name), manufactured by Dainichiseika Color & Chemicals Mfg. Co., Ltd.) serving as a pigment in an amount of 10 g, the phenoxyethyl methacrylate/methyl methacrylate/methacrylic acid copolymer (polymer pigment dispersant P-1) in an amount of 4.5 g, methylethylketone in an amount of 42 g, 1 mol/L tris(hydroxymethyl)aminomethane (THAM) serving as a pH adjusting agent in an amount of 5.5 g, and ion-exchanged water in an amount of 87.2 g were mixed and dispersed, and further processed with a dispersing machine ("MICROFLUIDIZER M-140K" (trade name) manufactured by Mizuho Industrial Co., Ltd., at a pressure of 150 MPa) for 8 passes.

Subsequently, the resulting dispersion was treated under reduced pressure at 56° C. to remove the methylethylketone and also remove a part of the water. Further, the dispersion was subjected to a 30 minute centrifugal treatment at 8,000 rpm with a high speed refrigerated centrifuge machine 7550 (trade name, manufactured by KUBOTA Corp.) and a 50 mL centrifuge tube so as to recover the resulting supernatant without precipitates. After that, the pigment concentration was evaluated from the absorption spectrum. A dispersion (cyan pigment dispersion C1) of resin coated pigment particles with a pigment concentration of 13.2% was obtained.

(Preparation of Cyan Pigment Dispersion C2)

Pigment Blue 15:3 ("PHTHALOCYANINE BLUE A220" (trade name), manufactured by Dainichiseika Color & Chemicals Mfg. Co., Ltd.) serving as a pigment in an amount of 10.0 g, sodium oleate (low molecular dispersant) in an amount of 1.0 g, glycerin in an amount of 4.0 g, and ion-exchanged water in an amount of 35.0 g were mixed by agitation to prepare a dispersion. Then, ultrasonic waves were intermittently irradiated (0.5 sec of irradiation/1.0 sec of rest) with an ultrasonic wave irradiator ("VIBRA-CELL VC-750" (trade name), manufactured by SONICS Inc., with a tapered microchip 5 mm in diameter, at an amplitude of 30%) to the dispersion for 2 hours so as to further disperse the pigment and to obtain a 20% by mass pigment dispersion C2.

(Preparation of Yellow Pigment Dispersion Y)

Pigment Yellow 74 ("SUIMEI FAST YELLOW L5G" (trade name)) serving as a pigment in an amount of 10 g, a phenoxyethyl methacrylate/methyl methacrylate/methacrylic acid copolymer (polymer pigment dispersant P-1) in an amount of 4.2 parts, methylethylketone in an amount of 42 parts, a 1 mol/L tris(hydroxymethyl)aminomethane (THAM) serving as a pH adjusting agent in an amount of 5.5 parts, ion-exchanged water in an amount of 87.2 parts were mixed and dispersed, further processed with a dispersing machine ("MICROFLUIDIZER M-140K" (trade name) manufactured by Mizuho Industrial Co., Ltd., at a pressure of 150 MPa) for 8 passes.

Subsequently, the resulting dispersion was treated under reduced pressure at 56° C. to remove the methylethylketone and also remove a part of the water. Further, the dispersion was subjected to a 30 minute centrifugal treatment at 8,000 rpm with a high speed refrigerated centrifuge machine 7550 (trade name, manufactured by KUBOTA Corp.) and a 50 mL centrifuge tube so as to recover the resulting supernatant without precipitates. After that, the pigment concentration was evaluated from the absorption spectrum. A dispersion (yellow pigment dispersion Y) of resin coated pigment particles with a pigment concentration of 13.2% was obtained.

(Preparation of Polymer Particle Dispersion)

In a two liter three-necked flask equipped with an agitator, a thermometer, a refluxing condenser tube, and a nitrogen gas introduction tube, 540.0 g of methylethylketone were charged and the temperature thereof was raised to 75° C. in a nitrogen gas atmosphere. While the temperature inside of the reactor was kept at 75° C., a mixed solution composed of 216 g of methyl methacrylate, 280.8 g of isobornyl methacrylate, 43.2 g of methacrylic acid, 108 g of methylethylketone, and 2.16 g of "V-601" (trade name, manufactured by Wako Pure Chemical Industries, Ltd.) was dropped at a constant speed in a manner that dropping was completed in 2 hours. After dropping was completed, a solution composed of 1.08 g of "V-601" and 15.0 g of methylethylketone was further added; then after 2 hour agitation at 75° C., a solution composed of 0.54 g of "V-601" and 15.0 g of methylethylketone was further added; then after 2 hour agitation at 75° C., the temperature was raised to 85° C.; and then agitation was further continued for 2 hours.

The weight average molecular weight (Mw) of the resulting copolymer was 61,000, and the acid value thereof was 52 (mgKOH/g).

Then, 588.2 g of the resulting polymer solution were weighed; 165 g of isopropanol and 120.8 mL of a 1 mol/L NaOH aqueous solution were added; and the temperature inside of the reactor was raised to 80° C. Next, 718 g of distilled water were dropped into the resulting reaction mixture at a rate of 20 mL/min so as to disperse the reaction mixture in water. After that, the inside of the reactor was kept at 80° C. for 2 hours, at 85° C. for 2 hours, and at 90° C. for 2 hours successively so as to distill out the distilled water and to obtain a water-based dispersion of polymer particles (B-01) with a solid content concentration of 26.0%. Note that, the composition of the polymer particles B-01 was methyl methacrylate/isobornyl methacrylate/methacrylic acid=40/52/8 (by mass ratio).

(Preparation of Cyan Ink C-01)

The cyan pigment dispersion C1 obtained above was used to prepare the following ink composition C, which was a mixture of the following components. The resulting composition was loaded in a disposal syringe and filtered with a PVDF 5 μm filter ("MILLEX-SV" (trade name), 25 mm in diameter, manufactured by Millipore Ltd.) to obtain a cyan ink (ink-jet ink composition) C-01.

| (Ink Composition C) | |
| --- | --- |
| Cyan pigment (Pigment Blue 15:3) | 2.5% |
| Polymer dispersant P-1 (solid content) | 1.125% |
| Polymer particles B-01 (solid content) | 6.25% |
| "SANNIX GP250" (trade name, manufactured by Sanyo Chemical Industries, Ltd., hydrophilic organic solvent) | 6.0% |
| Tripropyleneglycol monomethylether (TPGmME, Wako Pure Chemical Industries, Ltd., hydrophilic organic solvent) | 10.0% |
| "OLFIN E1010" (trade name, manufactured by Nissin Chemical Industry Co., Ltd., surfactant) | 1.0% |
| "NEWPOLE PE108" (trade name, manufactured by Sanyo Chemical Industries, Ltd., thickener) | 0.6% |
| Ion-exchanged water | Remainder, yielding a total amount of 100% |

(Preparation of Cyan Inks C-02 to C-16)

Cyan inks C-02 to C-16 were prepared respectively substantially similar to the preparation of the cyan ink C-01, except that the water-soluble acidic compounds or the salts thereof described in the following Table 1 were further added in an amount as described in Table 1. Note that, a compound A is an acidic compound that is represented by the following chemical formula and has a molecular weight of 424.

(Cyan Ink C-17)

A cyan ink C-17 was prepared substantially similar to the preparation of the cyan ink C-01, except that the cyan pigment dispersion C2 was used in an amount of 2.5% in terms of the cyan pigment in place of the cyan pigment dispersion C1 in the preparation of the cyan ink C-01, and that the water-soluble acidic compound described in the following Table 1 was further added in an amount as described in Table 1.

TABLE 1

| | Water-soluble acidic compounds and the salts thereof | | | |
| --- | --- | --- | --- | --- |
| Cyan ink | Species | Content (ppm) | Molecular weight | Remarks |
| C-01 | — | — | 138 | Comparative Example |
| C-02 | Sodium maleate | 25 | 138 | Comparative Example |
| C-03 | Sodium maleate | 60 | 138 | Present Invention |
| C-04 | Sodium maleate | 100 | 138 | Present Invention |
| C-05 | Sodium maleate | 350 | 138 | Present Invention |
| C-06 | Sodium maleate | 900 | 138 | Present Invention |
| C-07 | Sodium maleate | 1200 | 138 | Comparative Example |
| C-08 | Lithium maleate | 350 | 122 | Present Invention |
| C-09 | Potassium maleate | 350 | 154 | Present Invention |
| C-10 | Sodium succinate | 350 | 140 | Present Invention |
| C-11 | Sodium glutarate | 350 | 154 | Present Invention |
| C-12 | Sodium acetate | 350 | 82 | Present Invention |
| C-13 | Sodium butanate | 350 | 88 | Present Invention |
| C-14 | Maleic acid | 60 | 116 | Present Invention |
| C-15 | Compound A | 350 | 424 | Comparative Example |
| C-16 | Sodium oleate | 350 | 304 | Comparative Example |
| C-17 | Sodium maleate | 350 | 138 | Comparative Example |

Compound A (Preparation of Yellow Inks Y-01 to Y-16)

Yellow inks Y-01 to Y-16 were prepared substantially similar to the preparation of the cyan inks C-01 to C-16, except that, in the preparation of the cyan inks C-01 to C-16, the yellow pigment dispersion Y was used in place of the cyan pigment dispersion C1 and that the ink composition Y was changed into the following ink composition Y.

(Ink Composition Y)

| | |
|---|---|
| Yellow pigment (Pigment Yellow 74) | 4.0% |
| Polymer dispersant P-1 (solid content) | 1.68% |
| Polymer particles B-01 (solid content) | 7.0% |
| "SANNIX GP250" (trade name, manufactured by Sanyo Chemical Industries, Ltd., hydrophilic organic solvent) | 8.0% |
| Tripropyleneglycol monomethylether (TPGmME, Wako Pure Chemical Industries, Ltd., hydrophilic organic solvent) | 8.0% |
| "OLFIN E1010" (trade name, manufactured by Nissin Chemical Industry Co., Ltd., surfactant) | 1.0% |
| "NEWPOLE PE108" (trade name, manufactured by Sanyo Chemical Industries, Ltd., thickener) | 0.3% |
| Ion-exchanged water | Remainder, yielding a total amount of 100% |

(Preparation of Treatment Liquid)

A treatment liquid with the following composition was prepared by mixing each component together. The properties of a treatment liquid (1) were: 2.6 mPa·s of viscosity, 37.3 mN/m of surface tension, and 1.6 of pH (25° C.).

(Treatment liquid Composition)

| | |
|---|---|
| Malonic acid (dicarboxylic acid, manufactured by Wako Pure Chemical Industries, Ltd.) | 15.0% |
| Diethyleneglycol monomethylether (manufactured by Wako Pure Chemical Industries, Ltd.) | 20.0% |
| Sodium N-oleoyl-N-methyl taurine (surfactant) | 1.0% |
| Ion-exchanged water | 64.0% |

(Evaluation)
(Evaluation of Ink Stability)

Within 1 hour after ink preparation, each cyan ink of C-01 to C-17 prepared above was diluted with ion-exchanged water by from 50 times to 1000 times. With a "NANOTRAC" (trade name) particle size distribution measuring apparatus of UPA-EX150 manufactured by Nikkiso Co., Ltd., the volume average particle diameter My of each ink was measured, under the conditions of 25° C., particle transmission: transmit, particle shape: non-spherical, and particle density: 1.2, so as to obtain an initial particle diameter ($D_1$).

Next, each ink in an amount of 20 mL was charged in a glass bottle sealed with a plastic cap and stored at 70° C. for 1 month, and then the volume average diameter after storage was measured so as to obtain a particle diameter over time ($D_2$).

TABLE 2

| Cyan ink | Initial particle diameter ($D_1$) (nm) | Particle diameter over time ($D_2$) (nm) | $D_2 - D_1$ (nm) | Remarks |
|---|---|---|---|---|
| C-01 | 90 | 91 | 1 | Comparative Example |
| C-02 | 91 | 91 | 0 | Comparative Example |
| C-03 | 92 | 93 | 1 | Present Invention |
| C-04 | 92 | 92 | 0 | Present Invention |
| C-05 | 94 | 94 | 0 | Present Invention |
| C-06 | 95 | 97 | 2 | Present Invention |
| C-07 | 98 | 105 | 7 | Comparative Example |
| C-08 | 91 | 92 | 1 | Present Invention |
| C-09 | 91 | 91 | 0 | Present Invention |
| C-10 | 91 | 92 | 1 | Present Invention |
| C-11 | 91 | 91 | 0 | Present Invention |
| C-12 | 90 | 92 | 2 | Present Invention |
| C-13 | 92 | 92 | 0 | Present Invention |
| C-14 | 92 | 93 | 1 | Present Invention |
| C-15 | 91 | 93 | 2 | Comparative Example |
| C-16 | 90 | 90 | 0 | Comparative Example |
| C-17 | 89 | 100 | 11 | Comparative Example |

In Table 2, when the difference of ($D_2-D_1$) between the particle diameter over time ($D_2$) and the initial particle diameter ($D_1$) for each ink, only the cyan ink C-17 showed a difference of over 10 nm and was found to be insufficient in ink stability.

(Evaluation of Ink Droplet Ejection)
(Evaluation of Dot Diameter)

Two "GELJET GX5000" printer heads (trade name, manufactured by Ricoh Company Ltd.) were prepared, and ink tanks connected to these printer heads were refilled with the above prepared cyan inks C-01 to C-16 and yellow inks Y-01 to Y-16, respectively. The combinations of the cyan inks and the yellow inks used are shown in Table 3.

"TOKUBISHI ART PAPER DOUBLE-SIDED N" (trade name, manufactured by Mitsubishi Paper Mills Limited) serving as a recording medium was fixed on a stage that was movable at a speed of 500 mm/second linearly in a predetermined direction. While the temperature of the stage was kept at 30° C., the treatment liquid obtained above was coated with a bar coater to a thickness of about 1.2 μm. Immediately after coating, the resulting coating was dried at 50° C. for 2 seconds.

After that, the "GELJET GX5000" printer heads were positioned and fixed in a manner such that the direction (principal scanning direction) of the line heads along which print nozzles were arrayed was inclined at an angle of 75.7° with respect to the direction perpendicular to the moving direction (sub-scanning direction) of the stage. While the recording medium was moved at a constant speed in the sub-scanning direction, the inks were ejected according to the line system under ejection conditions of an ink droplet amount of 2.4 pL, an ejection frequency of 24 kHz, and a resolution of 1200 dpix 1200 dpi, so that yellow dots were printed on a cyan solid image.

Immediately after printing, the yellow dots on the cyan solid image were dried for 3 seconds at 60° C. and passed through a pair of fixing rollers heated at 60° C. so as to be fixed at a nip pressure of 0.25 MPa and a nip width of 4 mm. In this way, an evaluation sample of secondary color dots in which secondary color dot images of the yellow ink were formed on the cyan solid image was obtained.

Further, separately, in similar printing conditions, another evaluation sample of primary color dots in which primary color dot images were formed by using only the yellow ink was obtained.

With respect to the evaluation samples thus obtained, the diameter of the secondary color dot of yellow ink formed on the cyan solid image and the diameter of the primary color dot formed by using only the yellow ink were measured with a microscope for 20 dots each; the averages thereof were selected as the secondary color dot diameter and the primary color dot diameter respectively; the difference between the dot diameters (dot diameter difference) was calculated by subtracting the primary color dot diameter from the secondary color dot diameter; and the difference was evaluated in accordance with the following evaluation criteria.

(Evaluation Criteria)
A: dot diameter difference is 3.0 μm or less.
B: dot diameter difference is larger than 3.0 μm and 4.0 μm or less.
C: dot diameter difference is larger than 4.0 μm and 5.0 μm or less.
D: dot diameter difference is larger than 5.0 μm.
(Evaluation of Ejection Reliability)
A "GELJET GX5000" printer head (trade name, manufactured by Ricoh Company Ltd.) was prepared, and an ink tank connected to the printer head was refilled with the above prepared cyan inks C-01 to C-16 respectively.

A "KASSAI PHOTO QUALITY PAPER VALUE" (trade name, manufactured by Fujifilm Corp.) serving as a recording medium was fixed on a stage that is movable in a predetermined linear direction at a speed of 500 mm/second.

After that, the "GELJET GX5000" printer head was positioned and fixed in a direction perpendicular to the moving direction (sub scanning direction) of the stage. While the recording medium was moved at a constant speed in the sub-scanning direction, the cyan inks were printed in a line under ejection conditions of an ink droplet amount of 2.4 pL and an ejection frequency of 12 kHz. After all of the nozzles were confirmed to work adequately for printing, the nozzles were left in an environment of 25° C. of temperature and 50% RH for 10 minutes, and then the inks were ejected again. The number of ejections until blank shot failures and directional failures of ejection ceased and stable ejection started was counted and evaluated in accordance with the following evaluation criteria.
(Evaluation Criteria)
A: stable ejection started from the first shot.
B: stable ejection started after 2 to 120 shots.
C: stable ejection started after 121 to 1200 shots.

acidic compound having a molecular weight of 200 or less or a salt thereof in an amount of from 50 ppm to 1,000 ppm.
<2> The ink-jet ink composition according to <1>, wherein the water-soluble acidic compound is a compound having a carboxy group.
<3> The ink-jet ink composition according to <1>, wherein the polymer particles are self-dispersing polymer particles.
<4> The ink-jet ink composition according to <1>, wherein a hydrophobic structural unit incorporated in a polymer that forms the polymer particles comprises at least one structural unit derived from a (meth)acrylic monomer having a cyclic aliphatic group.
<5> The ink-jet ink composition according to <1>, wherein the polymer particles have a carboxy group.
<6> The ink-jet ink composition according to <1>, wherein the glass transition temperature of the polymer particles is from 40° C. to 180° C.
<7> The ink-jet ink composition according to <1>, wherein the polymer pigment dispersant contains a carboxy group.
<8> The ink-jet ink composition according to <1>, wherein the hydrophilic organic solvent is an (alkyleneoxy)alcohol or an (alkyleneoxy)alkyl ether.
<9> An ink set comprising: the ink-jet ink composition according to <1> and a treatment liquid that forms an aggregate when contacted with the ink-jet ink composition.
<10> The ink set according to <9>, wherein the treatment liquid contains a compound having a carboxy group.
<11> An image forming method comprising: applying, onto a recording medium, a treatment liquid that forms an aggregate when contacted with the ink-jet ink composition according to <1>; and applying the ink-jet ink composition onto the recording medium so as to form an image.

All publications, patent applications, and technical standards mentioned in this specification are herein incorporated

TABLE 3

| No. | Cyan ink | Yellow ink | Primary color dot diameter (μm) | Secondary color dot diameter (μm) | Dot diameter difference (μm) | Dot diameter difference evaluation | Ejection reliability | Remarks |
|---|---|---|---|---|---|---|---|---|
| 1 | C-01 | Y-01 | 32.0 | 37.0 | 5.0 | C | A | Comparative Example |
| 2 | C-02 | Y-02 | 32.1 | 36.2 | 4.1 | C | A | Comparative Example |
| 3 | C-03 | Y-03 | 32.3 | 35.8 | 3.5 | B | A | Present Invention |
| 4 | C-04 | Y-04 | 32.3 | 35.7 | 3.4 | B | A | Present Invention |
| 5 | C-05 | Y-05 | 32.0 | 35.5 | 3.5 | B | A | Present Invention |
| 6 | C-06 | Y-06 | 31.6 | 35.2 | 3.6 | B | B | Present Invention |
| 7 | C-07 | Y-07 | 32.0 | 35.0 | 3.0 | A | C | Comparative Example |
| 8 | C-08 | Y-08 | 31.9 | 35.5 | 3.6 | B | A | Present Invention |
| 9 | C-09 | Y-09 | 32.0 | 35.5 | 3.5 | B | A | Present Invention |
| 10 | C-10 | Y-10 | 32.0 | 35.5 | 3.5 | B | A | Present Invention |
| 11 | C-11 | Y-11 | 31.9 | 35.5 | 3.6 | B | A | Present Invention |
| 12 | C-12 | Y-12 | 32.2 | 35.7 | 3.5 | B | A | Present Invention |
| 13 | C-13 | Y-13 | 32.3 | 36.3 | 4.0 | B | A | Present Invention |
| 14 | C-14 | Y-14 | 32.3 | 35.8 | 3.5 | B | A | Present Invention |
| 15 | C-15 | Y-15 | 32.2 | 38.0 | 5.8 | D | A | Comparative Example |
| 16 | C-16 | Y-16 | 32.0 | 36.5 | 4.5 | C | A | Comparative Example |

Table 3 shows that the ink-jet ink composition of the present invention allows the dot diameter difference between the primary color dot diameter and the secondary color dot diameter to be reduced. In addition, the ink-jet ink composition of the present invention is shown to be excellent in ejection reliability.

The present invention includes the following embodiments.
<1> An ink-jet ink composition comprising: a pigment, a polymer pigment dispersant, polymer particles, a hydrophilic organic solvent, water, and at least one of a water-soluble by reference to the same extent as if each individual publication, patent application, or technical standard was specifically and individually indicated to be incorporated by reference.

What is claimed is:

1. An ink-jet ink composition comprising: a pigment, a polymer pigment dispersant, polymer particles, a hydrophilic organic solvent, water, and at least one of a water-soluble acidic compound having a molecular weight of 200 or less or a salt thereof in an amount of from 50 ppm to 1,000 ppm, wherein a hydrophobic structural unit incorporated in a polymer that forms the polymer particles comprises at least one structural unit derived from a (meth)acrylic monomer having a cyclic aliphatic group.

2. The ink jet ink composition according to claim 1, wherein the water-soluble acidic compound is a compound having a carboxy group.

3. The ink-jet ink composition according to claim 1, wherein the polymer particles are self-dispersing polymer particles.

4. The ink jet ink composition according to claim 1, wherein the polymer particles have a carboxy group.

5. The ink-jet ink composition according to claim 1, wherein the glass transition temperature of the polymer particles is from 40° C. to 180° C.

6. The ink-jet ink composition according to claim 1, wherein the polymer pigment dispersant contains a carboxy group.

7. The ink-jet ink composition according to claim 1, wherein the hydrophilic organic solvent is an (alkyleneoxy) alcohol or an (alkyleneoxy)alkyl ether.

8. An ink set comprising: the ink jet ink composition according to claim 1 and a treatment liquid that forms an aggregate when contacted with the ink-jet ink composition.

9. The ink set according to claim 8, wherein the treatment liquid contains a compound having a carboxy group.

10. An image forming method comprising: applying, onto a recording medium, a treatment liquid that forms an aggregate when contacted with the ink jet ink composition according to claim 1; and applying the ink jet ink composition onto the recording medium so as to form an image.

11. The ink-jet ink composition according to claim 1, wherein the at least one of a water-soluble acidic compound having a molecular weight of 200 or less or a salt thereof is at least one selected from the group consisting of water-soluble acidic compounds having a molecular weight of 150 or less, and salts thereof.

12. The ink-jet ink composition according to claim 1, wherein the at least one of a water-soluble acidic compound having a molecular weight of 200 or less or a salt thereof is at least one selected from the group consisting of acrylic acid, methacrylic acid, maleic acid, malic acid, tartaric acid, fumaric acid, lactic acid, succinic acid, glutaric acid, butanoic acid, acetic acid, methane sulfonic acid, p-toluene sulfonic acid, and salts thereof.

13. The ink-jet composition according to claim 1, wherein the at least one of a water-soluble acidic compound having a molecular weight of 200 or less or a salt thereof is at least one selected from the group consisting of maleic acid, malic acid, tartaric acid, succinic acid, glutaric acid, acetic acid, butanoic acid, and alkali metal salts thereof.

\* \* \* \* \*